United States Patent
Vrame et al.

(10) Patent No.: US 6,590,155 B2
(45) Date of Patent: Jul. 8, 2003

(54) FLOOR STAND FOR MOUNTING ELECTRICAL BOX AND FOR SUPPORTING CONDUIT

(75) Inventors: Paul A. Vrame, 1341 Fountain Green Dr., Crystal Lake, IL (US) 60014; Peter A. Vrame, Barrington Hills, IL (US)

(73) Assignee: Paul A. Vrame, Crystal Lake, IL (US)

( * ) Notice: Subject to any disclaimer, the term of this patent is extended or adjusted under 35 U.S.C. 154(b) by 0 days.

(21) Appl. No.: 09/930,645

(22) Filed: Aug. 15, 2001

(65) Prior Publication Data

US 2002/0157845 A1 Oct. 31, 2002

Related U.S. Application Data

(63) Continuation-in-part of application No. 09/841,867, filed on Apr. 25, 2001.

(51) Int. Cl.[7] ................................................. H02G 3/08
(52) U.S. Cl. ............................ 174/50; 174/63; 174/64; 248/906; 248/205.1; 220/3.7; 220/3.8; 439/535
(58) Field of Search ............................. 174/50, 53, 54, 174/58, 60, 63, 64; 220/3.2, 3.3, 3.8, 3.6, 3.7; 248/906, 27.1, 205.1; 439/535

(56) References Cited

U.S. PATENT DOCUMENTS

| | | | |
|---|---|---|---|
| 4,603,789 A | * | 8/1986 | Medlin, Sr. ............. 220/3.3 X |
| 4,832,297 A | * | 5/1989 | Carpenter ............... 248/205.1 |
| 5,098,046 A | | 3/1992 | Webb |
| 5,224,673 A | * | 7/1993 | Webb ....................... 248/27.1 |
| 5,288,041 A | | 2/1994 | Webb |
| 5,330,137 A | | 7/1994 | Oliva |
| 5,423,499 A | | 6/1995 | Corbin et al. |
| 5,448,011 A | * | 9/1995 | Laughlin ..................... 174/48 |
| 5,931,425 A | | 8/1999 | Oliva |
| 6,098,939 A | | 8/2000 | He |
| 6,423,897 B1 | * | 7/2002 | Roesch et al. ................ 174/50 |
| 6,429,371 B2 | * | 8/2002 | Schiedegger et al. ......... 174/50 |

OTHER PUBLICATIONS

"EZ Floor Stand Box Support", advertising sheet of S–P Products, Inc., Elk Grove Village, Illinois—undated—admitted prior art.

"Conduit Support", page from catalog of Erico International, Inc., Solon, Ohio—undated—admitted prior art.

* cited by examiner

Primary Examiner—Dean A. Reichard
Assistant Examiner—Dhiru R Patel
(74) Attorney, Agent, or Firm—Wood, Phillips, Katz, Clark & Mortimer

(57) ABSTRACT

A floor stand for mounting an electrical box and for supporting a conduit extending downwardly to the electrical box has a conduit-supporting flange projecting backwardly from an upper portion of the upright member and is adapted to mount an electrical box so as to bear against a back face of the floor stand, beneath the conduit-supporting flange, which has three apertures, each adapted to pass a conduit extending downwardly through the aperture, to an electrical box so mounted. The conduit-supporting flange has a slot communicating with each aperture, from an edge of the conduit-supporting flange, and the conduit-supporting flange has a tab adjacent to the slot. The tab is adapted to permit a conduit to enter that aperture from the edge of the conduit-supporting flange, via the slot, if the tab is bent sufficiently, and to block a conduit from exiting that aperture, via the slot, if tab is unbent. The floor stand has three wall-attachable flanges, each having a not-in-use position, in which it projects vertically, beneath the conduit-supporting flange, each having an in-use position, in which it projects backwardly and is attachable to a wall behind the floor stand.

2 Claims, 2 Drawing Sheets

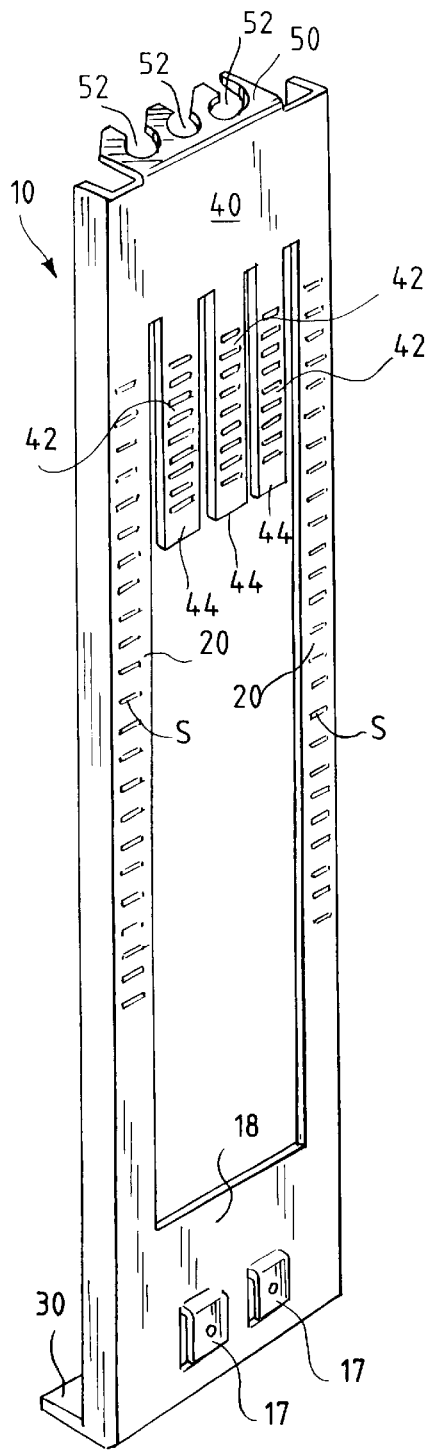
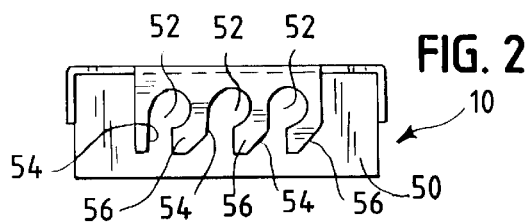
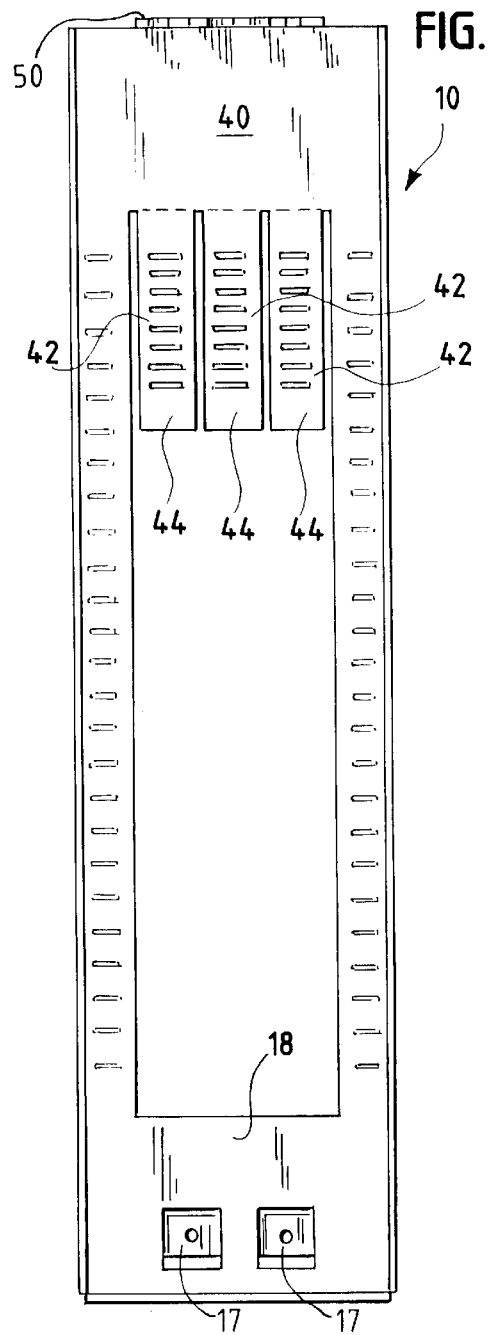

FLOOR STAND FOR MOUNTING ELECTRICAL BOX AND FOR SUPPORTING CONDUIT

CROSS-REFERENCE TO RELATED APPLICATION

This application is a continuation-in-part of U.S. patent application Ser. No. 09/841,867, which was filed on Apr. 25, 2001, which is entitled FLOOR STAND FOR ELECTRICAL BOX HAVING PLASTER RING, and the disclosure of which is incorporated herein by reference.

BACKGROUND OF THE INVENTION

Commonly, an electrical box having a plaster ring defines a generally rectangular cavity, which is bounded by an upper wall, a lower wall, and two lateral walls, each said wall having a distal edge, and by a back wall. The plaster ring, which may be also called a mud ring or a faceplate, defines a generally rectangular frame, which is bounded by an upper member, a lower member, and two lateral members. The plaster ring is fastenable to the electrical box, via fasteners passing through slots in the plaster ring into ears on the electrical box, so that the upper member of the plaster ring is aligned with the distal edge of the upper wall of the electrical box, so that the lower member of the plaster ring is aligned with the diatal edge of the lower wall of the electrical box, and so that each of the lateral members of the plaster ring is aligned with the diatal edge of one of the lateral walls of the electrical box.

For mounting an electrical box having a plaster ring, as described above, it has been known to use a floor stand (such as the EZ Floor Stand Box Support, which is available commercially from S-P Products, Inc. of Elk Grove Village, Ill.) to which the electrical box is fastened by fasteners passing through holes in the back wall of the electrical box, into holes selected from series of holes spaced vertically and incrementally along the floor stand, or to which the plaster ring is fastened by fasteners passing through slots or holes in the plaster ring, into holes selected therefrom. The floor stand permits the electrical box having the plaster ring not only to be horizontally positionable, because the floor stand does not fasten to a stud, but also to be vertically positionable at incrementally spaced positions above a floor.

For mounting an electrical box having a plaster ring, as described above, between two studs, it is known to use a mounting bracket defining elongate frame having an upper member and member and mounting the electrical box having the plaster ring, via fasteners passing between the upper and lower members. See U.S. Pat. Nos. 5,330,137 and 5,931,425, both to John H. Oliva.

SUMMARY OF THE INVENTION

Broadly, this invention provides improvements in the floor stand disclosed in the aforenoted application, of which this application is a continuation-in-part. As improved by this invention, the floor stand not only mounts an electrical box, which may have a plaster ring, but also supports a conduit extending downwardly to the electrical box. As improved by this invention, the floor stand is intended to meet electrical codes calling for a conduit to be supported within a prescribed distance (e.g., one foot) from an electrical box, without a need for a conduit-supporting structure separate from the floor stand.

As improved by this invention, the floor stand has a conduit-supporting flange projecting backwardly from an upper portion of the floor stand. The floor stand is adapted to mount an electrical box so as to bear against the back face of the floor stand, beneath the conduit-supporting flange, and the conduit-supporting flange has an aperture adapted to pas a conduit extending downwardly through the aperture, as from a ceiling junction, to an electrical box so mounted.

Preferably, the conduit-supporting flange is made from a bendable material (e.g., sheet steel, which has been galvanized) and has a slot communicating with the aperture, from an edge of the conduit-supporting flange, and a tab adjacent to the slot. The tab is adapted to permit a conduit to enter the aperture from the edge of the conduit-supporting flange, via the slot, if the tab is bent sufficiently, and to block the conduit from exiting the aperture, via the slot, if the tab is unbent.

The aperture may be one of a plural number of like apertures, the slot may be one of an equal number of like slots, and the tab may be one of an equal number of like tabs, each aperture functioning similarly, each slot functioning similarly, and each tab functioning similarly. Preferably, three such apertures, three such slots, and three such tabs are provided.

Preferably, the upright member is made from the same material, which is bendable, and the upright member has an equal number of like wall-attachable flanges. Each wall-attachable flange is bendable from a non-in-use position, in which said wall-attachable flange projects vertically, into an in-use position, in which said wall-attachable flange projects backwardly and is attachable to a wall behind the floor stand. Preferably, before being from its not-in-use position, each wall-attachable flange projects downwardly.

If a plural number of the wall-attachable flanges are provided, this invention enables an installer to select and to utilize, for bending into its in-use position and for attaching to a wall behind the floor stand, a wall-attachable flange that does not interfere with a conduit extending downwardly to the electrical box, so long as fewer conduits extend downwardly to the electrical box, as compared to the plural number of the wall-attachable flanges.

Advantageously, a floor stand embodying this invention can embody features of the floor stand disclosed in the aforenoted application, of which this application is a continuation-in-part.

BRIEF DESCRIPTION OF THE DRAWINGS

FIG. 1 is a perspective view of a floor stand, as intended for mounting an electrical box having a plaster ring and for supporting a conduit extending downwardly to the electrical box.

FIG. 2 is a front elevation of the floor stand, as shown in FIG. 1.

FIG. 3 is a top plan of the floor stand, as shown in FIGS. 1 and 2.

DETAILED DESCRIPTION OF THE ILLUSTRATED EMBODIMENT

Figure 4:
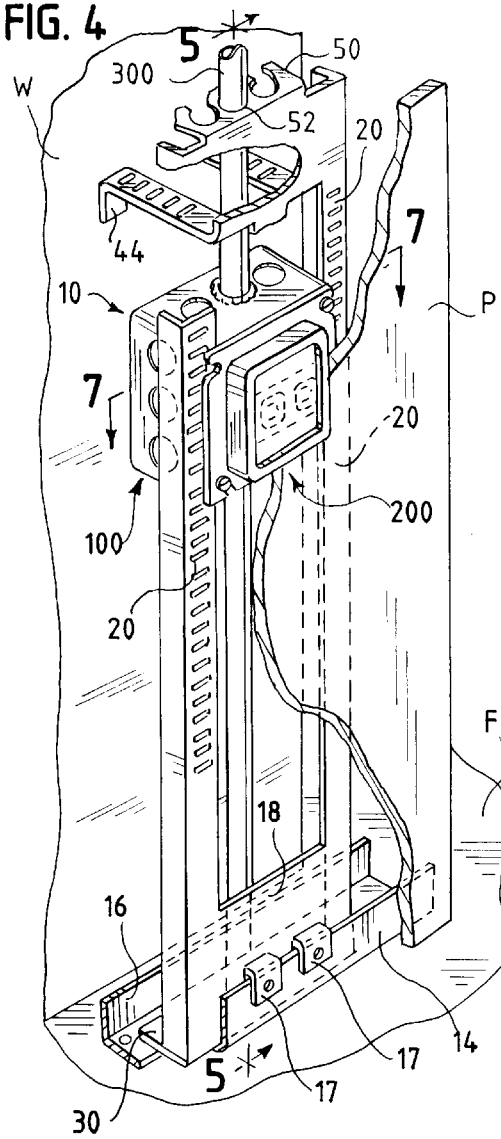
FIG. 4 is a partly fragmentary, perspective view of the floor stand, as utilized for mounting an electrical box having a plaster ring and for supporting a conduit extending downwardly to the electrical box.
Figure 5:
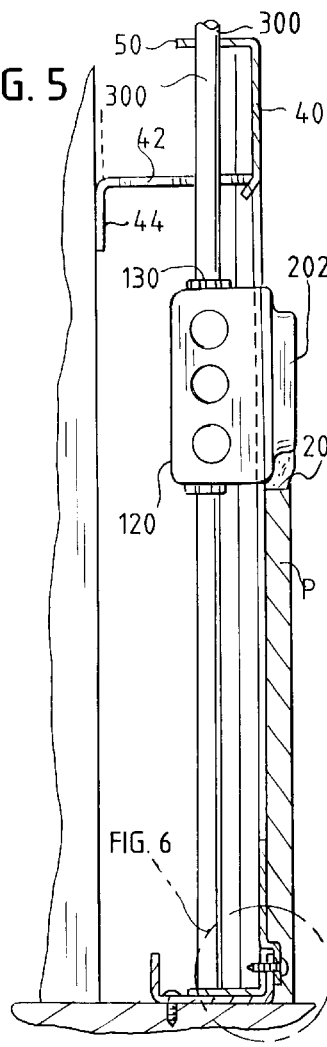
FIG. 5 is a sectional view taken along line 5—5 in FIG. 4, in a direction indicated by arrows.
Figure 6:
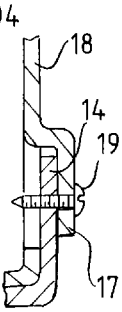
FIG. 6 is an enlarged detail, which is taken from a region encircled in FIG. 5.
Figure 7:
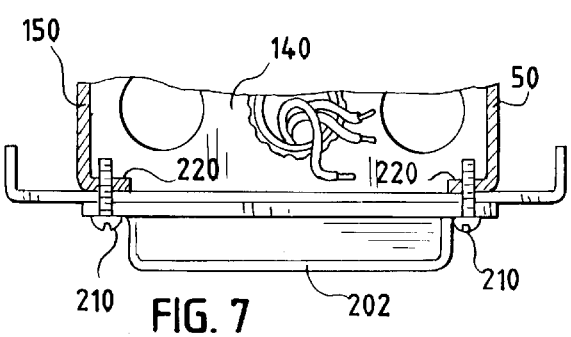
FIG. 7 is a sectional view taken along line 7—7 in FIG. 4, in a direction indicated by arrows.
Figure 8:
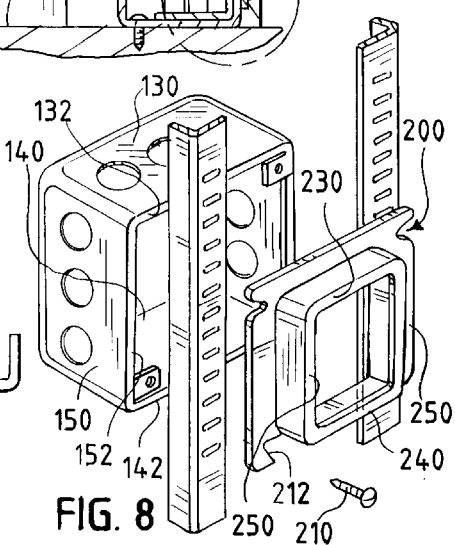
FIG. 8 is an enlarged, fragmentary, exploded detail, which is taken from FIG. 4.

Except as illustrated and described in this application, a floor stand 10 constituting a preferred embodiment of this invention is similar to the floor stand disclosed in the aforenoted application, of which this application is a continuation-in-part. As shown in the drawings, the floor stand 10 is stamped from sheet metal, such as galvanized steel, which is bendable. The floor stand 10, which is mounted on a floor F in a known manner, is useful for mounting an electrical box 100 having a plaster ring 200, either before or after a drywall panel P is installed, so that a front portion 202 of the plaster ring 200 projects frontwardly through an aperture 204 cut in the drywall panel P. As shown, drywall-finishing material, which installers call "mud", is applied around the front portion 202 of the plaster ring 200.

As shown, the floor stand 10 is mounted to a channel 12, which is fastened to the floor F and which has a front flange 14 and a back flange 16, via two spaced tabs 17 projecting from a lower portion 18 of the floor stand 20 and being clipped over the front flange 14, to which each of the spaced tabs 17 is fastened via a screw 19. The floor stand 10 permits the electrical box 100 having the plaster ring 200 to be horizontally positionable, because the floor stand 10 does not fasten to a stud, and permits the electrical box 100 having the plaster ring 200 to be vertically positionable anywhere within a useful range of positions above the floor F, which may be a concrete, wooden, or other floor.

Being conventional, the electrical box 100 defines a generally rectangular cavity, which is bounded by a back wall 120, an upper wall 130 having a distal edge 132, a lower wall 140 having a distal edge 142, and two lateral walls 150, each lateral wall 150 having a distal edge 152. Being conventional, the plaster ring 200 defines a generally rectangular frame 208, which frames the front portion 202 and which is bounded by an upper member 230, a lower member 240, and two lateral members 250. The plaster ring 200 is fastenable to the electrical box 100, via fasteners 210, such as screws, which pass through slots 212 in the plaster ring 200, into ears 220 extending from the electrical box 100.

As shown, the floor stand 10 has two parallel uprights 20, each having an upper end 22 and a lower end 24 and each having an outer, backturned, stiffening flange 26. The parallel uprights 20 are stamped, imprinted, or marked otherwise with scales S (e.g., in centimeters, inches, or both) which demarcate vertical positions within the useful range wherein the electrical box 100 having the plaster ring 200 is positionable. The lower portion 18 of the floor stand 10 has a flange 30, which extends backwardly and which is seated within the channel 12, between the front flange 14 and the back flange 16. The floor stand 10 has an upper structure 40 including three like flanges 42, each terminating in a tab 44. Each flange 42 is bendable between a non-in-use position, in which said tab 44 projects downwardly and the tab 44 of said flange 42 projects downwardly, and an in-use position, in which said tab 44 projects backwardly and in which the tab 44 of said flange 42 is downturned, as shown in full lines, or is upturned, as shown in broken lines. The downturned or upturned tab 44 of each flange 42 projecting backwardly is adapted to be permanently attached by fasteners, such as screws and anchors, to a concrete or other wall W behind the floor stand 10. It is convenient to refer to each flange 42 as a wall-attachable flange.

As shown, when the plaster ring 200 is fastened to the electrical box 100, the fasteners 210 pass between the parallel uprights 20 of the floor stand 10. Further, the upper member 230 of the plaster ring 200 is aligned with the distal edge 132 of the upper wall 130 of the electrical box 100, the lower member 240 of the plaster ring 200 is aligned with the distal edge 142 of the lower wall 140 of the electrical box 100, and each of the lateral members 250 of the plaster ring 200 is aligned with the distal edge 152 of one of the lateral walls 140 of the electrical box 100. Thus, the plaster ring 200 bears against a front face of the floor stand 10 and the electrical box 100 bears against a back face of the floor stand 10, so that the parallel uprights 20 of the floor stand 10 are clamped between the lateral members 250 of the plaster ring 200 and the distal edges 152 of the lateral walls 150 of the electrical box 100 having the plaster ring 200.

The floor stand 10 permits the electrical box 100 having the plaster ring 200 not only to be horizontally positionable, because the floor stand 10 does not fasten to a stud, but also to be vertically positionable anywhere within a useful range of positions above the floor F.

The upper structure 40 of the floor stand 10 has a upper, unitary flange 50 having three similar apertures 52, each adapted to pass a conduit 300 extending downwardly to the electrical box 100 mounted to the floor stand 10, as described above. At each aperture 52, the upper flange 50 has a channel 54 communicating with said aperture 52, from an edge of the upper flange 50, and a tab 56 adjacent to the channel 54. Being bendable, the tab 56 is adapted to permit a conduit 300 to enter said aperture 52 from the same edge, via the channel 54, if the tab 56 is bent sufficiently, and to block the conduit 300 from exiting said aperture 52, via the channel 54, if the tab 56 is unbent. It is convenient to refer to the upper flange 50 as a conduit-supporting flange.

Each wall-attachable flange 42 is aligned vertically with one of the apertures 52 of the conduit-supporting flange 50. Thus, an installer is enabled to select and to utilize, for bending into its in-use position and for attaching to the wall W behind the floor stand, a wall-attachable flange 42 that does not interfere with a conduit 300 extending downwardly from a ceiling junction (not shown) to the electrical box 100. As shown, one conduit 300 and two wall-attachable flanges 42 are utilized. Each flange 42 not utilized is allowed to remain in its not-in-use position, unless said flange 42 would interfere with the electrical box 100. If said flange 42 would interfere with the electrical box, said flange 42 not utilized is removed, as by using snips to cut said flange 42 away or by bending said flange 42 back-and-forth repeatedly until said flange 42 is broken away. As shown in FIG. 4, two outer flanges 42 are utilized and a conduit 300 extends downwardly between the outer flanges 42, a middle flange 42 having been removed.

What is claimed is:

1. A floor stand for mounting an electrical box and for supporting a conduit extending downwardly to the electrical box, the floor stand having a front face and a back face and having a conduit-supporting flange projecting backwardly from an upper portion of an upright member, the floor stand being adapted to mount the electrical box so as to bear against the back face of the floor stand, beneath the conduit-supporting flange, said flange having a plurality of apertures adapted to pass said conduit extending downwardly through one of said plurality of apertures to the electrical box, wherein the conduit-supporting flange is bendable, wherein the conduit supporting flange having a plurality of channels communicating with said plurality of apertures from an edge of the conduit-supporting flange, and wherein the conduit supporting flange having a plurality of tabs adjacent to said plurality of channels, wherein one of the tabs is adapted to permit said conduit to enter one of said apertures from the edge of the conduit-supporting flange via one of said channels, if the tab is bent sufficiently, and wherein one of the tabs is adapted to block said conduit from exiting one of the apertures via one of the channels, if the tab is unbent.

2. The floor stand of claim 1 wherein the floor stand has an equal number of like wall-attachable flanges, each wall-attachable flange being aligned vertically with one of said apertures, each wall-attachable flange having a not-in-use position, in which said wall-attachable flange projects vertically, beneath the conduit-supporting flange, each wall attachable flange having an in-use position, in which said wall attachable flange projects backwardly and is attachable to a wall behind the floor stand.

* * * * *